(12) United States Patent
Kenworthy et al.

(10) Patent No.: US 12,090,551 B2
(45) Date of Patent: Sep. 17, 2024

(54) REMOVAL OF SUPPORTS, AND OTHER MATERIALS FROM SURFACE, AND WITHIN HOLLOW 3D PRINTED PARTS

(71) Applicant: DIVERGENT TECHNOLOGIES, INC., Los Angeles, CA (US)

(72) Inventors: Michael Thomas Kenworthy, Rancho Palos Verdes, CA (US); Taylor Caitlin Doty, Redondo Beach, CA (US); Bahram Issari, Los Angeles, CA (US); Narender Shankar Lakshman, Hermosa Beach, CA (US); Krzysztof Artysiewicz, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 17/728,476

(22) Filed: Apr. 25, 2022

(65) Prior Publication Data

US 2022/0339707 A1    Oct. 27, 2022

Related U.S. Application Data

(60) Provisional application No. 63/179,116, filed on Apr. 23, 2021.

(51) Int. Cl.
  *B22F 10/62*    (2021.01)
  *B22F 10/40*    (2021.01)
  (Continued)

(52) U.S. Cl.
  CPC ............... *B22F 10/43* (2021.01); *B22F 10/40* (2021.01); *B22F 10/62* (2021.01); *B22F 10/64* (2021.01);
  (Continued)

(58) Field of Classification Search
  CPC .......... B22F 10/43; B22F 10/40; B22F 10/62; B22F 10/64; B22F 10/66; B22F 10/28;
  (Continued)

(56) References Cited

U.S. PATENT DOCUMENTS

| | | |
|---|---|---|
| 5,203,226 A | 4/1993 | Hongou et al. |
| 5,742,385 A | 4/1998 | Champa |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)

(Continued)

*Primary Examiner* — Rebecca Janssen
(74) *Attorney, Agent, or Firm* — ARENTFOX SCHIFF LLP

(57) ABSTRACT

Methods for removing support structures in additively manufactured parts are disclosed. A method in accordance with an aspect of the present disclosure comprises inserting a demolition object in a first state into a hollow portion of a 3-D printed part, breaking a support structure within the hollow portion by contact with the demolition object, changing the demolition object into a second state while the demolition object is within the hollow portion of the 3-D printed part, and removing the demolition object from the hollow portion of the 3-D printed part.

12 Claims, 15 Drawing Sheets

(51) Int. Cl.
*B22F 10/43* (2021.01)
*B22F 10/64* (2021.01)
*B22F 10/66* (2021.01)
*B33Y 10/00* (2015.01)
*B33Y 40/20* (2020.01)
*B22F 10/28* (2021.01)

(52) U.S. Cl.
CPC .............. *B22F 10/66* (2021.01); *B33Y 10/00* (2014.12); *B33Y 40/20* (2020.01); *B22F 10/28* (2021.01)

(58) Field of Classification Search
CPC .. B22F 2999/00; B22F 10/68; B22F 2202/01; B33Y 10/00; B33Y 40/20; Y02P 10/25
See application file for complete search history.

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |

(56) References Cited

U.S. PATENT DOCUMENTS

| | | |
|---|---|---|
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |

(56) References Cited

U.S. PATENT DOCUMENTS

| | | |
|---|---|---|
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2014/0277669 A1 | 9/2014 | Nardi et al. |
| 2017/0113344 A1 | 4/2017 | Schönberg |
| 2017/0129173 A1 | 5/2017 | Mantell et al. |
| 2017/0232671 A1 | 8/2017 | Fieldman |
| 2017/0291374 A1 | 10/2017 | Mosher |
| 2017/0341309 A1 | 11/2017 | Piepenbrock et al. |
| 2019/0176403 A1* | 6/2019 | Hutchinson .............. B08B 5/02 |
| 2020/0079028 A1 | 3/2020 | Miller et al. |
| 2020/0207018 A1 | 7/2020 | Arnon et al. |
| 2022/0274178 A1* | 9/2022 | Ceriani .................. G06F 30/10 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and the Written Opinion issued in PCT/US22/26199, mailed Jul. 18, 2022.

* cited by examiner

REMOVAL OF SUPPORTS, AND OTHER MATERIALS FROM SURFACE, AND WITHIN HOLLOW 3D PRINTED PARTS

CROSS-REFERENCE TO RELATED APPLICATIONS

The present disclosure claims the benefit under 35 U.S.C. 119 of U.S. Provisional Patent Application No. 63/179,116, filed Apr. 23, 2021 and entitled "REMOVAL OF SUPPORTS, AND OTHER MATERIALS FROM SURFACE, AND WITHIN HOLLOW 3D PRINTED PARTS", which application is incorporated by reference herein in its entirety.

BACKGROUND

Field

The present disclosure relates generally to additively manufactured structures, and more specifically to removal of supports from additively manufactured structures.

Description of the Related Technology

Some Additive Manufacturing (AM) processes involve the use of a stored geometrical model for accumulating layered materials on a "build plate" to produce three-dimensional (3-D) objects having features defined by the model. AM techniques are capable of printing complex parts or components using a wide variety of materials. A 3-D object is fabricated based on a computer-aided design (CAD) model. The AM process can manufacture a solid three-dimensional object directly from the CAD model without additional tooling.

One example of an AM process is powder bed fusion (PBF), which uses a laser, electron beam, or other source of energy to sinter or melt powder deposited in a powder bed, thereby consolidating powder particles together in targeted areas to produce a 3-D structure having the desired geometry. Different materials or combinations of materials, such as metals, plastics, and ceramics, may be used in PBF to create the 3-D object. Other AM techniques, including those discussed further below, are also available or under current development, and each may be applicable to the present disclosure.

Another example of an AM process is called Binder Jet (BJ) process that uses a powder bed (similar to PBF) in which metallic powder is spread in layers and bonded by using an organic binder. The resulting part is a green part which requires burning off the binder and sintering to consolidate the layers into full density. The metallic powder material can have the same chemical composition and similar physical characteristics as PBF powders.

Another example of an AM process is called Directed Energy Deposition (DED). DED is an AM technology that uses a laser, electron beam, plasma, or other method of energy supply, such as those in Tungsten Inert Gas (TIG), or Metal Inert Gas (MIG) welding to melt the metallic powder, wire, or rod, thereby transforming it into a solid metal object. Unlike many AM technologies, DED is not based on a powder bed. Instead, DED uses a feed nozzle to propel the powder or mechanical feed system to deliver powder, wire, or rod into the laser beam, electron beam, plasma beam, or other energy stream. The powdered metal or the wire or rod are then fused by the respective energy beam. While supports or a freeform substrate may in some cases be used to maintain the structure being built, almost all the raw material (powder, wire, or rod) in DED is transformed into solid metal, and consequently, little waste powder is left to recycle. Using a layer by layer strategy, the print head, comprised of the energy beam or stream and the raw material feed system, can scan the substrate to deposit successive layers directly from a CAD model.

PBF, BJ, DED, and other AM processes may use various raw materials such as metallic powders, wires, or rods. The raw material may be made from various metallic materials. Metallic materials may include, for example, aluminum, or alloys of aluminum. It may be advantageous to use alloys of aluminum that have properties that improve functionality within AM processes. For example, particle shape, powder size, packing density, melting point, flowability, stiffness, porosity, surface texture, density electrostatic charge, as well as other physical and chemical properties may impact how well an aluminum alloy performs as a material for AM. Similarly, raw materials for AM processes can be in the form of wire or rod whose chemical composition and physical characteristics may impact the performance of the material. Some alloys may impact one or more of these or other traits that affect the performance of the alloy for AM.

One or more aspects of the present disclosure may be described in the context of the related technology. None of the aspects described herein are to be construed as an admission of prior art, unless explicitly stated herein.

SUMMARY

Several aspects of additively manufactured structures, and more specifically to removal of supports from additively manufactured structures, are described herein.

A method in accordance with an aspect of the present disclosure may comprise inserting a demolition object in a first state into a hollow portion of a 3-D printed part, breaking a support structure within the hollow portion by contact with the demolition object, changing the demolition object into a second state while the demolition object is within the hollow portion of the 3-D printed part, and removing the demolition object from the hollow portion of the 3-D printed part.

A method in accordance with an aspect of the present disclosure may comprise inserting a demolition object in a first state into a hollow portion of a 3-D printed part, breaking a support structure within the hollow portion by contact with the demolition object, changing the demolition object into a second state while the demolition object is within the hollow portion of the 3-D printed part, and removing the demolition object from the hollow portion of the 3-D printed part.

Such a method further optionally includes the demolition object being inserted with an energy sufficient to break the support structure within the hollow portion of the 3-D printed part, agitating the 3-D printed part while the demolition object is within the hollow portion of the 3-D printed part, wherein the first state including a hardened state and the second state includes a softened state, the hardened state being an unmelted state, the softened state being a melted state, and changing the demolition object into the melted state includes increasing a temperature in the hollow portion of the 3-D printed part, and the demolition object comprising at least a material having a melting temperature lower than a melting temperature of the 3-D printed part.

Such a method further optionally includes the demolition object including a dissolvable portion, the first state includes an undissolved state, the second state including a dissolved state that includes a solution of the dissolvable portion, and changing the demolition object into the dissolved state includes introducing a solvent into the hollow portion of the 3-D printed part.

Such a method further optionally includes the dissolvable portion comprising the entire demolition objection, and changing the demolition object into the second state includes dissolving the entire demolition object, removing the demolition object includes removing the solution from the hollow portion of the 3-D printed part, the demolition object further includes an insoluble portion, and the solution includes the insoluble portion, which has not been dissolved, the insoluble portion includes at least aluminum, stainless steel, copper, cobalt, chrome, titanium, magnesium, calcium, silicon, zinc, zirconium, tungsten, gold, iron, cadmium, manganese, lead, mercury, radioactive metals, other metals, ceramics, organic materials, alloys thereof, or combinations thereof, changing the demolition object into the dissolved state including introducing at least water, an acidic, an electrolyte, a salt, a base, an electrical force, a radiation, a sound, an ultrasound, a pressure, a magnetic force, a vibration, and a rotational force, and the dissolvable portion including at least an adhesive and a polymer.

Such a method further optionally includes the demolition object including a shape memory alloy (SMA), the first state including a first shape of the SMA at a first temperature, and the second state including a second shape of the SMA at a second temperature, the changing of the SMA into the second state being configured to create a force on the support structure, and breaking the support structure is caused by the force, changing the demolition object from the second state back into the first state while the demolition object is within the hollow portion of the 3-D printed part, inserting the demolition object including injecting the demolition object into the hollow portion of the 3-D printed part by the force of at least a liquid or a gas, the demolition object is inserted into a first opening in the 3-D printed part and removed through a second opening in the 3-D printed part, and an initial shape of the demolition object being too large to be removed through the second opening in the 3-D printed part.

It will be understood that other aspects of structures and structures having sensors will become readily apparent to those of ordinary skill in the art from the following detailed description, wherein it is shown and described only several embodiments by way of illustration. As will be realized by those of ordinary skill in the art, the manufactured structures and the methods for manufacturing these structures are capable of other and different embodiments, and its several details are capable of modification in various other respects, all without departing from the disclosure. Accordingly, the drawings and detailed description are to be regarded as illustrative in nature and not as restrictive.

BRIEF DESCRIPTION OF THE DRAWINGS

Various aspects of alloys that may be used for additive manufacturing, for example, in automotive, aerospace, and/or other engineering contexts are presented in the detailed description by way of example, and not by way of limitation, in the accompanying drawings, wherein.

DETAILED DESCRIPTION

Figure 1A:
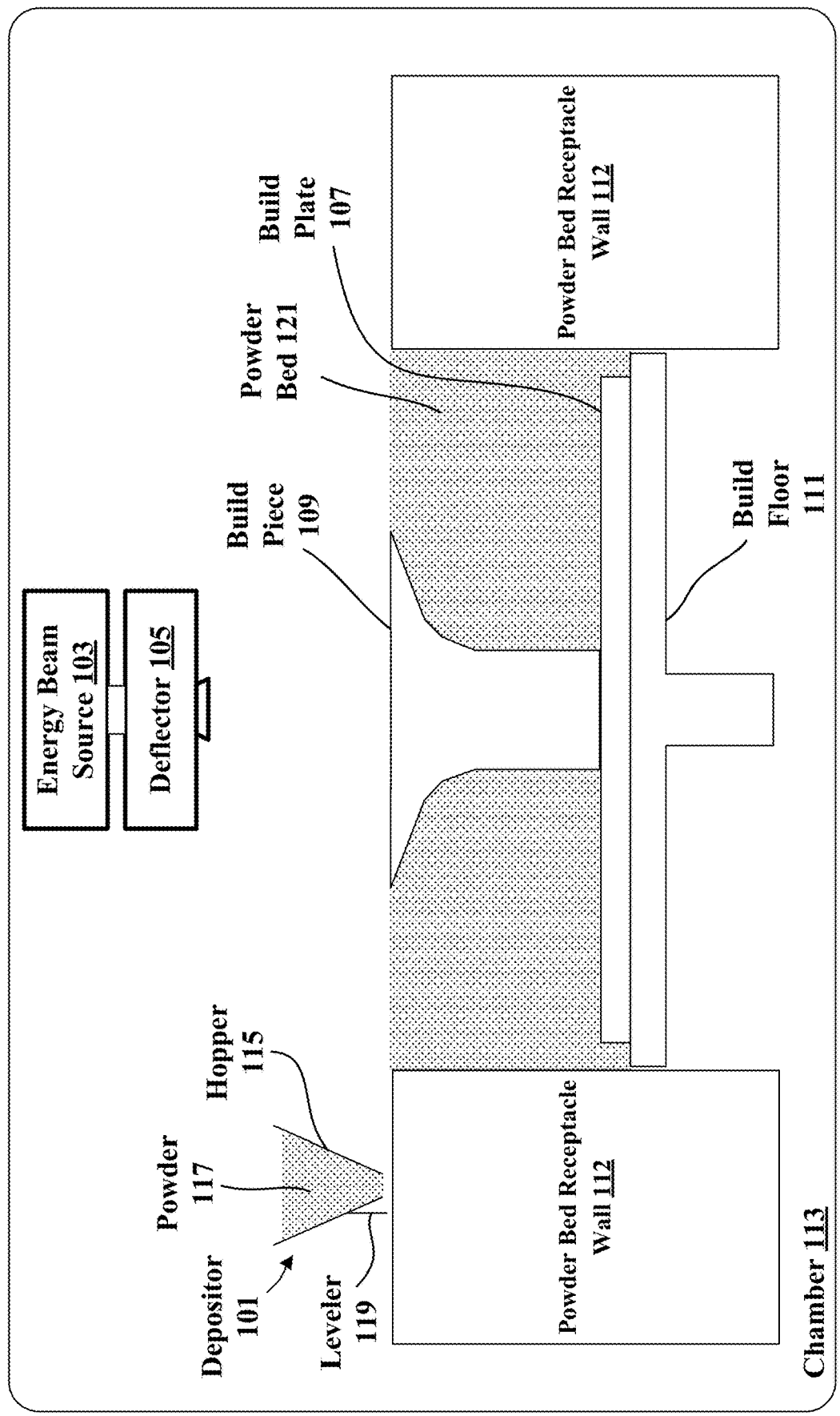
FIGS. 1A-1D illustrate respective side views of a 3-D printer system in accordance with an aspect of the present disclosure.

The detailed description set forth below in connection with the appended drawings is intended to provide a description of various exemplary embodiments are not intended to represent the only embodiments in which the disclosure may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the disclosure to those of ordinary skill in the art. However, the techniques and approaches of the present disclosure may be practiced without these specific details. In some instances, well-known structures and components may be shown in block diagram form, or omitted entirely, in order to avoid obscuring the various concepts presented throughout this disclosure.

FIGS. 1A-D illustrate respective side views of an exemplary 3-D printer system.

In this example, the 3-D printer system is a powder-bed fusion (PBF) system 100. FIGS. 1A-D show PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein.

PBF System 100 may be an electron-beam PBF system 100, a laser PBF system 100, or other type of PBF system 100. Further, other types of 3-D printing, such as Directed Energy Deposition, Selective Laser Melting, Binder Jet, etc., may be employed without departing from the scope of the present disclosure.

PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. Although the terms "fuse" and/or "fusing" are used to describe the mechanical coupling of the powder particles, other mechanical actions, e.g., sintering, melting, and/or other electrical, mechanical, electromechanical, electrochemical, and/or chemical coupling methods are envisioned as being within the scope of the present disclosure.

PBF system 100 can also include a build floor 111 positioned within a powder bed receptacle. The walls 112 of the powder bed receptacle generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

AM processes may produce various support structures that need to be removed. The particular embodiments illustrated in FIGS. 1A-D are some suitable examples of a PBF system employing principles of the present disclosure. Specifically, support structures and methods to remove them described herein may be used in at least one PBF system 100 described in FIGS. 1A-D. While one or more methods described in the present disclosure may be suitable for various AM processes (e.g., using a PBF system, as shown in FIGS. 1A-D), it will be appreciated that one or more methods of the present disclosure may be suitable for other applications, as well. For example, one or more methods described herein may be used in other fields or areas of manufacture without departing from the scope of the present disclosure. Accordingly, AM processes employing the one or more methods of the present disclosure are to be regarded as illustrative, and are not intended to limit the scope of the present disclosure.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
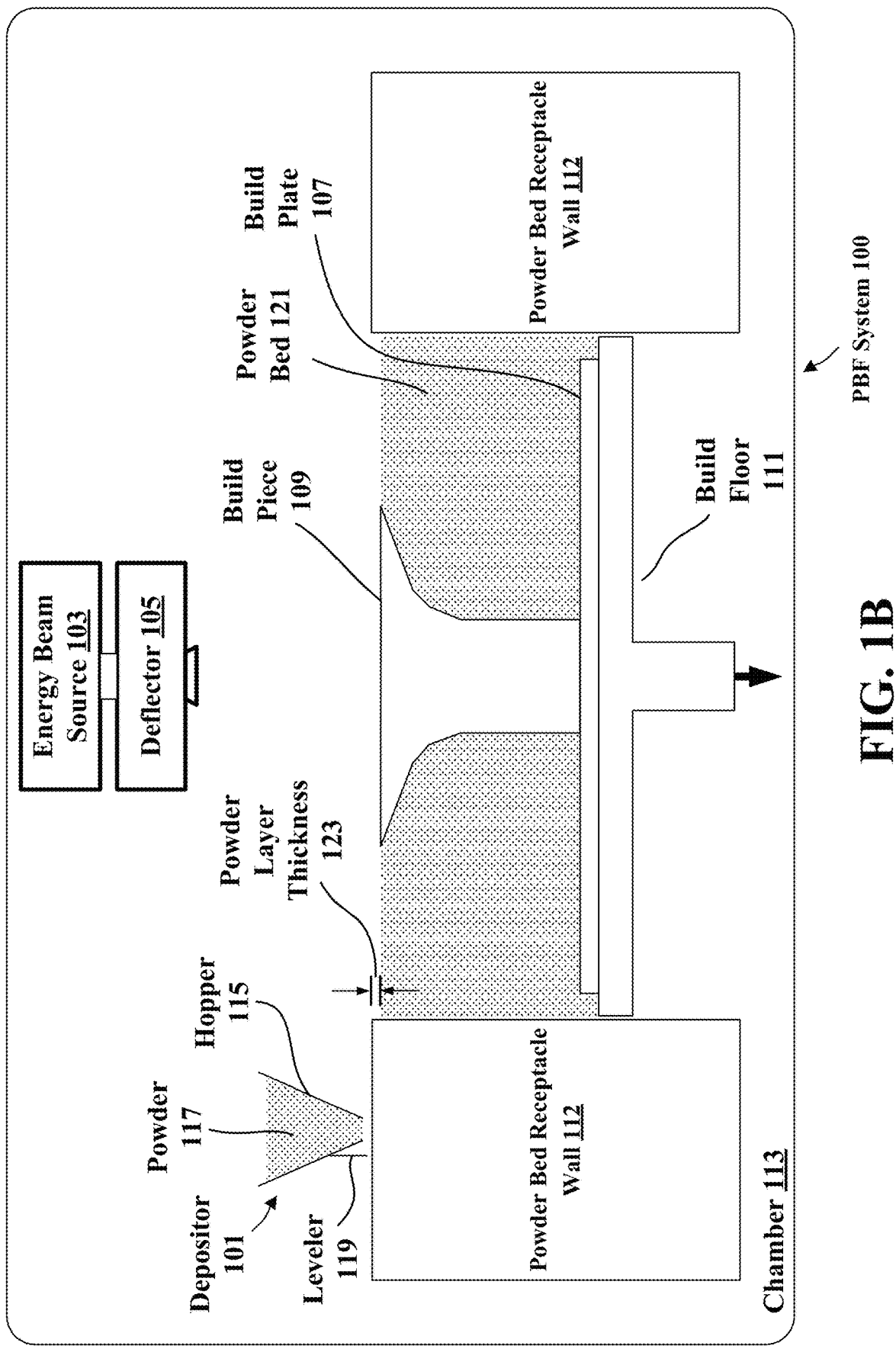

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
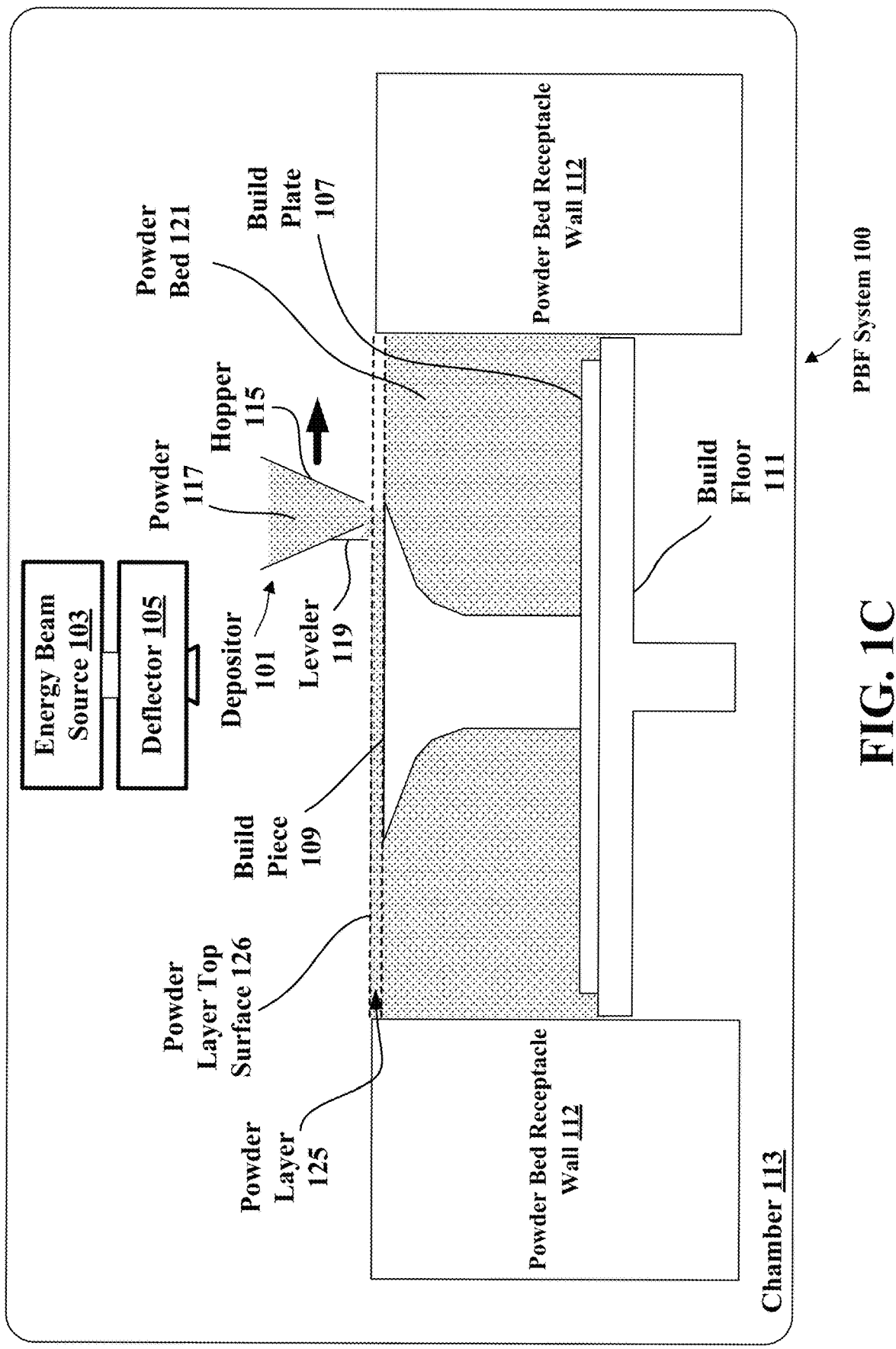

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness substantially equal to the powder layer thickness 123 (see FIG. 1B) and exposing powder layer top surface 126. Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving 150 previously-deposited layers discussed herein with reference to FIG. 1A.

Figure 1D:
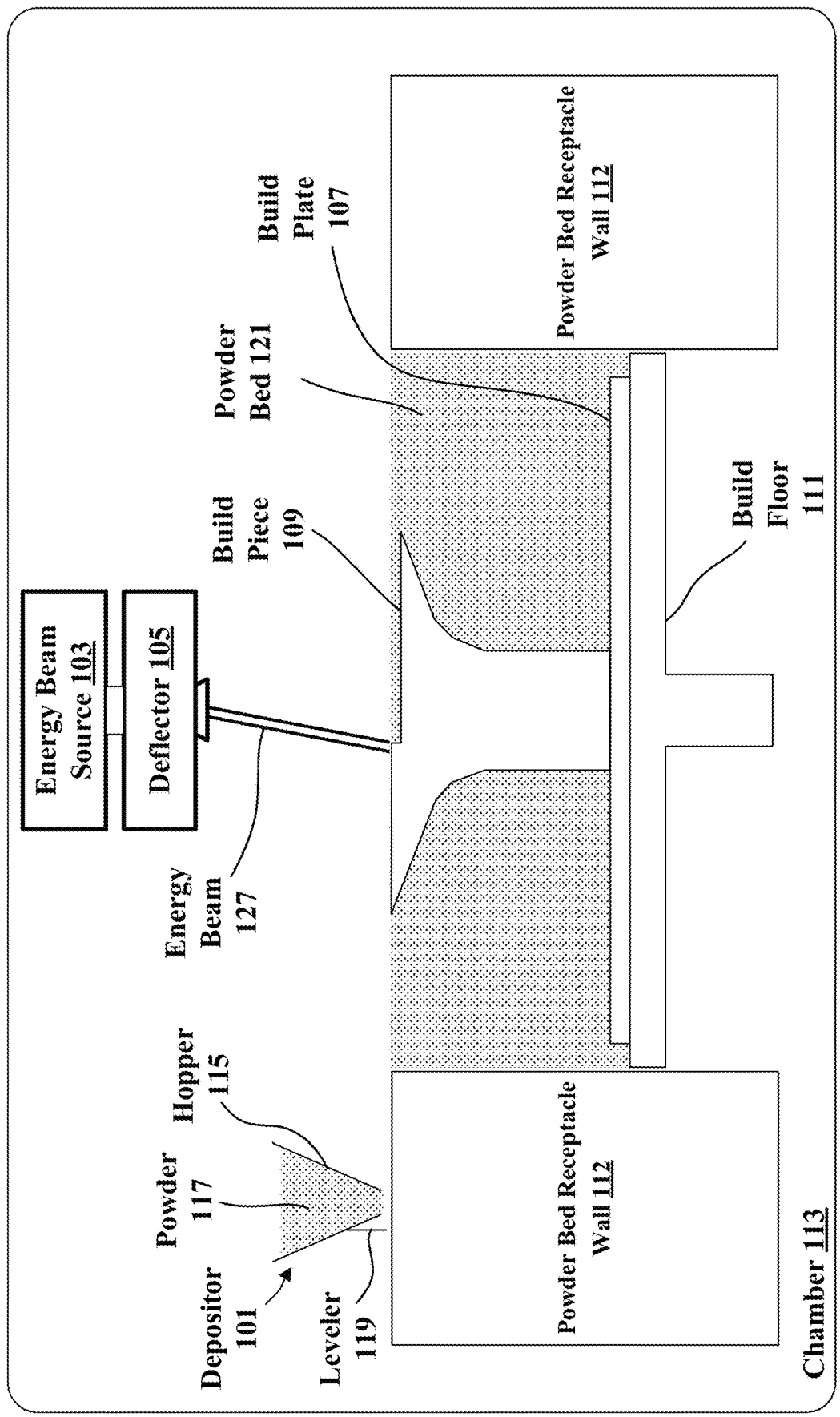

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 1E:
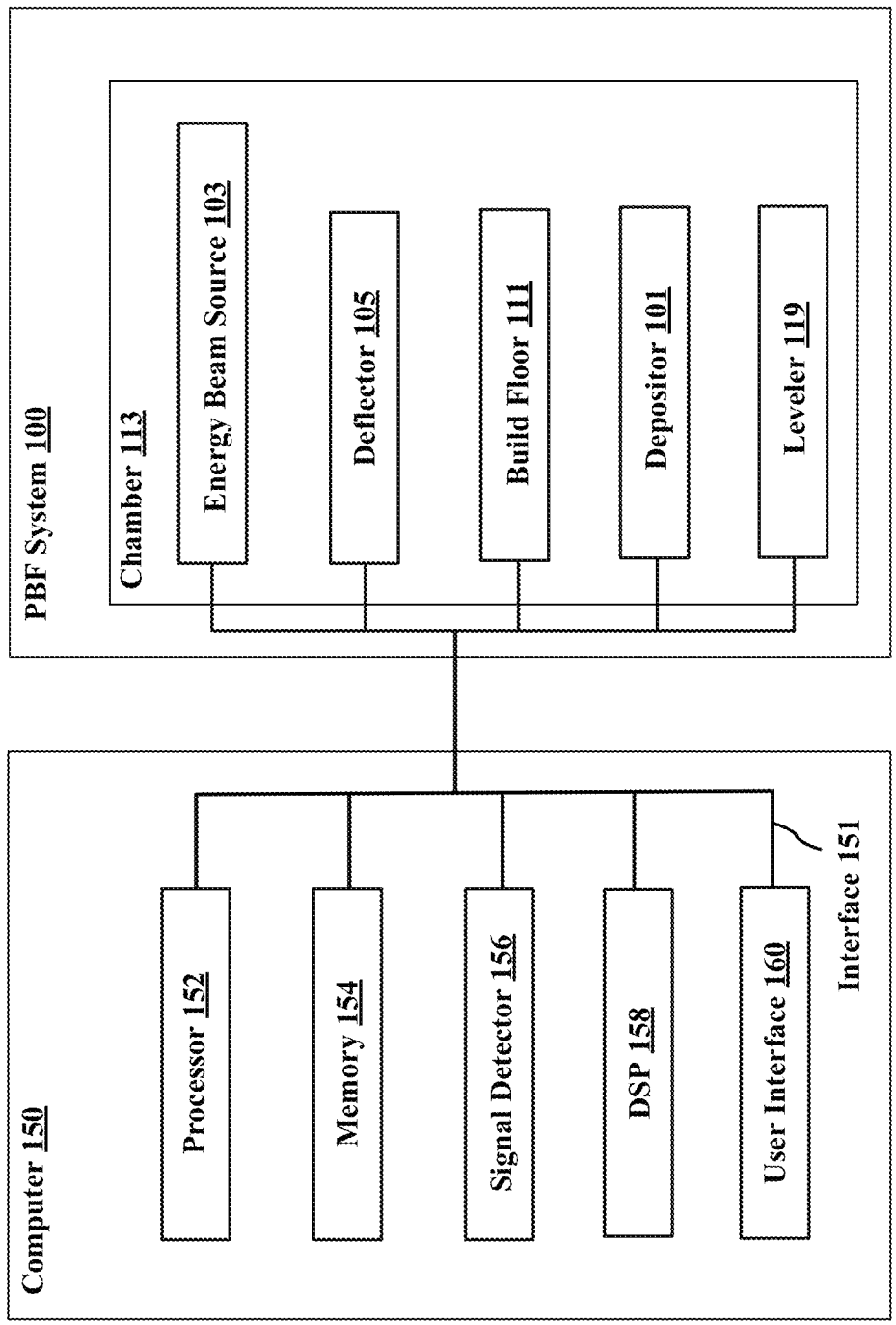
FIG. 1E illustrates a functional block diagram of a 3-D printer system in accordance with an aspect of the present disclosure.

FIG. 1E illustrates a functional block diagram of a 3-D printer system in accordance with an aspect of the present disclosure.

In an aspect of the present disclosure, control devices and/or elements, including computer software, may be coupled to PBF system 100 to control one or more components within PBF system 100. Such a device may be a computer 150, which may include one or more components that may assist in the control of PBF system 100. Computer 150 may communicate with a PBF system 100, and/or other AM systems, via one or more interfaces 151. The computer 150 and/or interface 151 are examples of devices that may be configured to implement the various methods described herein, that may assist in controlling PBF system 100 and/or other AM systems.

In an aspect of the present disclosure, computer 150 may comprise at least one processor 152, memory 154, signal detector 156, a digital signal processor (DSP) 158, and one or more user interfaces 160. Computer 150 may include additional components without departing from the scope of the present disclosure.

Processor 152 may assist in the control and/or operation of PBF system 100. The processor 152 may also be referred to as a central processing unit (CPU). Memory 154, which may include both read-only memory (ROM) and random access memory (RAM), may provide instructions and/or data to the processor 152. A portion of the memory 154 may also include non-volatile random access memory (NVRAM). The processor 152 typically performs logical and arithmetic operations based on program instructions stored within the memory 154. The instructions in the memory 154 may be executable (by the processor 152, for example) to implement the methods described herein.

The processor 152 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor 152 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

Signal detector 156 may be used to detect and quantify any level of signals received by the computer 150 for use by the processor 152 and/or other components of the computer 150. The signal detector 156 may detect such signals as energy beam source 103 power, deflector 105 position, build floor 111 height, amount of powder 117 remaining in depositor 101, leveler 119 position, and other signals. DSP 158 may be used in processing signals received by the computer 150. The DSP 158 may be configured to generate instructions and/or packets of instructions for transmission to PBF system 100.

The user interface 160 may comprise a keypad, a pointing device, and/or a display. The user interface 160 may include any element or component that conveys information to a user of the computer 150 and/or receives input from the user.

The various components of the computer 150 may be coupled together by interface 151, which may include, e.g., a bus system. The interface 151 may include a data bus, for example, as well as a power bus, a control signal bus, and a status signal bus in addition to the data bus. Components of the computer 150 may be coupled together or accept or provide inputs to each other using some other mechanism.

Although a number of separate components are illustrated in FIG. 1E, one or more of the components may be combined or commonly implemented. For example, the processor 152 may be used to implement not only the functionality described herein with respect to the processor 152, but also to implement the functionality described herein with respect to the signal detector 156, the DSP 158, and/or the user interface 160. Further, each of the components illustrated in FIG. 1E may be implemented using a plurality of separate elements.

Figure 2:
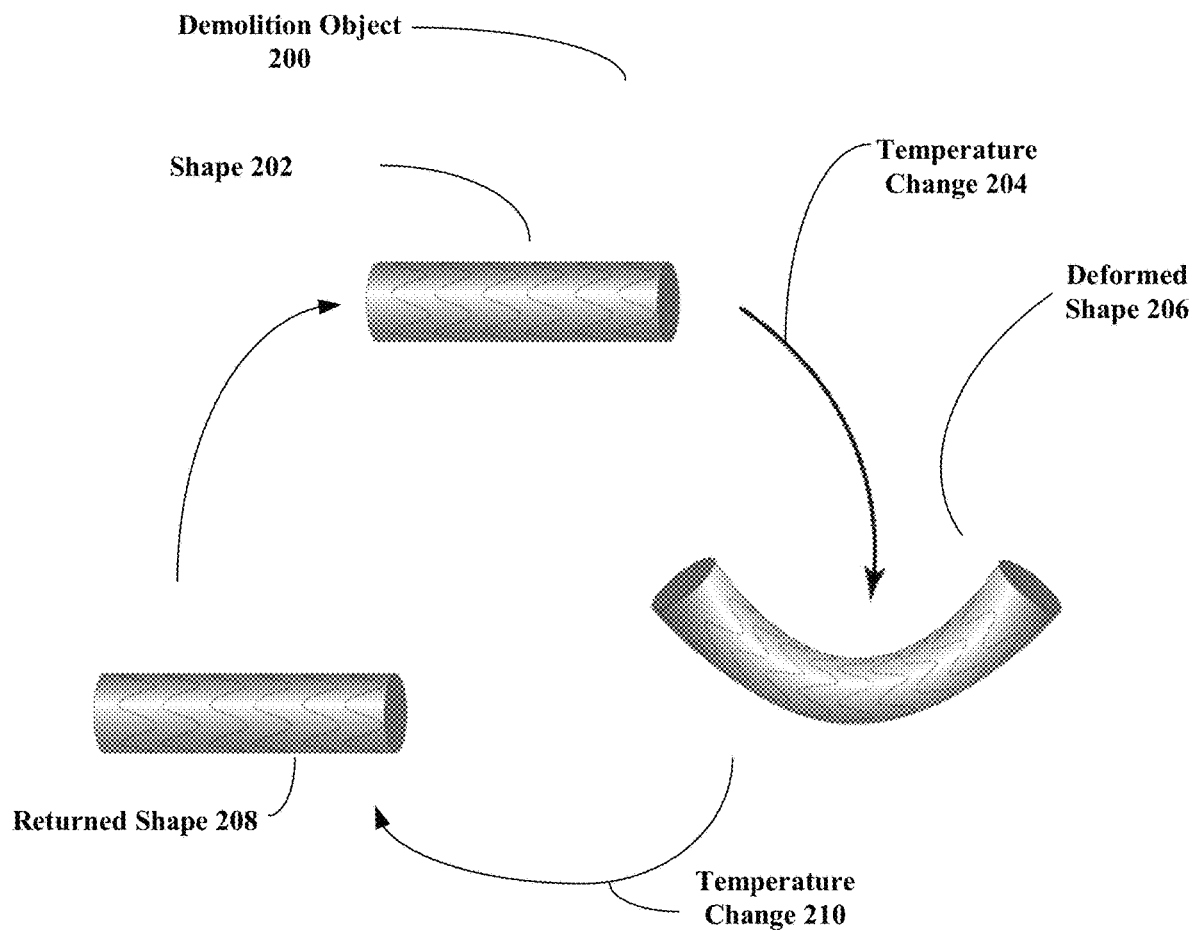
FIG. 2 illustrates a demolition object in accordance with an aspect of the present disclosure.

FIG. 2 illustrates a demolition object in accordance with an aspect of the present disclosure.

3D printing allows for creation of hollow parts which may have internal support structures printed inside the hollow portion to help maintain the part or component shape during the printing process. The use of support structures is applicable 3D printing of organic, metal, hybrid metal/organic, plastic, etc. Once the 3D printing process is completed it may be advantageous to remove the internal and external support structures for weight reduction, or to provide additional flexibility in a printed organic part, for example.

In an aspect of the present disclosure, internal support structures can be removed by breaking up or pulverizing the support structures through the introduction of demolition objects into the hollow portion of the printed part. Demolition objects can be, for example, ball bearings, shot, or other shapes of solid objects that are inserted into openings in the printed part and agitated with sufficient force to break the support structures. The demolition objects can then be physically removed by orienting the part to enable egress of the demolition object, e.g., through a hole.

In an aspect of the present disclosure, the state of the demolition object may be changed from a hardened or solid state to a softened or melted/malleable state. For example, the hardened state may be a solid, undissolved, or unmelted state of the material, or an enlarged/elongated state of a shape memory alloy material, and a softened state may be a melted, dissolved, or liquefied state of a meltable material or a deformed shape of a shape memory alloy material. In an aspect of the present disclosure, the hardened state may be an assembled or combined state of the demolition object, and the softened state may be a disassembled or detached state of the demolition object.

In an aspect of the present disclosure, softenable or meltable ball bearings, shots, or other shaped objects may be used to allow for ease of egress of the demolition objects after removal of the support structures. In such an aspect, demolition objects that may remain trapped within the parts can still be removed by subjecting the printed part to temperatures above the melt point of the demolition objects. This increase in temperature can facilitate removal of the demolition objects from the printed part. The printed part can be subjected to such increased temperatures by direct heating, or introduction of hot gaseous or liquid media into the hollow structure, causing softening or melting of the solid objects. The freed, or melted objects can fall out through any opening in the printed part or be removed together with the hot gaseous or liquid matter introduced into the hollow structure.

In an aspect of the present disclosure, the shape and size of demolition objects are chosen based on maximizing density, enhancing break force, and matching melt temperature, such that the melting temperature of the demolition object is sufficiently below the point at which the hollow printed part might be adversely affected, e.g., melted, softened, etc. The gas used may be, e.g., an inert gas that can be safely heated to high temperatures. The liquid used may be, e.g., water, or may be an organic or inorganic solution containing salts, or a combination thereof. It may be advantageous to use a gaseous or liquid medium that is not corrosive to the demolition objects or to the hollow printed parts.

In an aspect of the present disclosure, any meltable alloys used as demolition objects can be designed to reduce or minimize toxicity during handling, use, and disposal. For example, and not by way of limitation, cadmium-free alloys may be used. Similarly, liquids or solvents having minimal or reduced toxicity may be preferred, such as water, to reduce exposure to harmful chemicals and disposal concerns.

In an aspect of the present disclosure, shape memory alloy (SMA) materials may be used to allow for the demolition objects to change shape while inside of the printed part or component. SMA materials change shape and/or size upon the application of heat.

As shown in FIG. 2, a demolition object 200 may be made from an SMA material. The shape 202 of demolition object 200 in a first state may be a cylinder as shown, or may be another shape as desired. As the demolition object 200 is subjected to a temperature change 204, demolition object may enter a second state in which its shape changes from shape 202 to deformed shape 206. Temperature change 204 may be an increase in temperature experienced by demolition object 200 or a decrease in temperature depending on the material demolition object 200 is made of.

In an aspect of the present disclosure, the demolition object 200 may only change shape from shape 202 to deformed shape 206 upon application of temperature change 204. Once demolition object 200 is in deformed shape 206, some SMA materials cannot revert to shape 202. Such SMA materials may be known as "one-way" SMA materials.

In an aspect of the present disclosure, the demolition object 200 may change shape from shape 202 to deformed shape 206 upon application of temperature change 204, and may change to a returned shape 208 upon experiencing temperature change 210. Returned shape 208 may be similar to or the same as original shape 202 depending on the amount of temperature change 204 and temperature change 210, the SMA material used, or other factors. Such SMA materials may be known as "two-way" SMA materials. Demolition objects 200 made from SMA materials may be used in place of, or in conjunction with, meltable materials for demolition objects 200 as desired.

Some SMA materials that may be used for demolition objects 200 are nickel-titanium alloys, e.g., nitinol, copper-based alloys, cadmium alloys, nickel-manganese-gallium alloys, and iron alloys.

In an aspect of the present disclosure, demolition objects 200 may be inserted into a 3D printed part or component at ambient temperature. In such an aspect, an SMA material may be in deformed shape 206. Temperature change 210 may be applied to the printed part to expand to returned shape 208, which may provide for breaking the support structures within the hollow cavities of the printed part. The temperature may then be reduced, e.g., temperature change 204 may be applied, to return the demolition object 200 to deformed shape 206, which may facilitate egress of the demolition object 200 from the printed part. As demolition object 200 is removed from the printed part, the broken support structures may also be removed from the printed part.

In an aspect of the present disclosure, the demolition object may be changed multiple times for a given demolition object 200. For example, and not by way of limitation, the demolition object may be introduced into the printed part or component in deformed shape 206, changed to returned shape 208 while within the printed part or component, and then changed back to deformed shape 206 for ease of removal of demolition object 200.

FIGS. 3A-3F illustrate demolition objects in accordance with various aspects of the present disclosure.

Figure 3A:
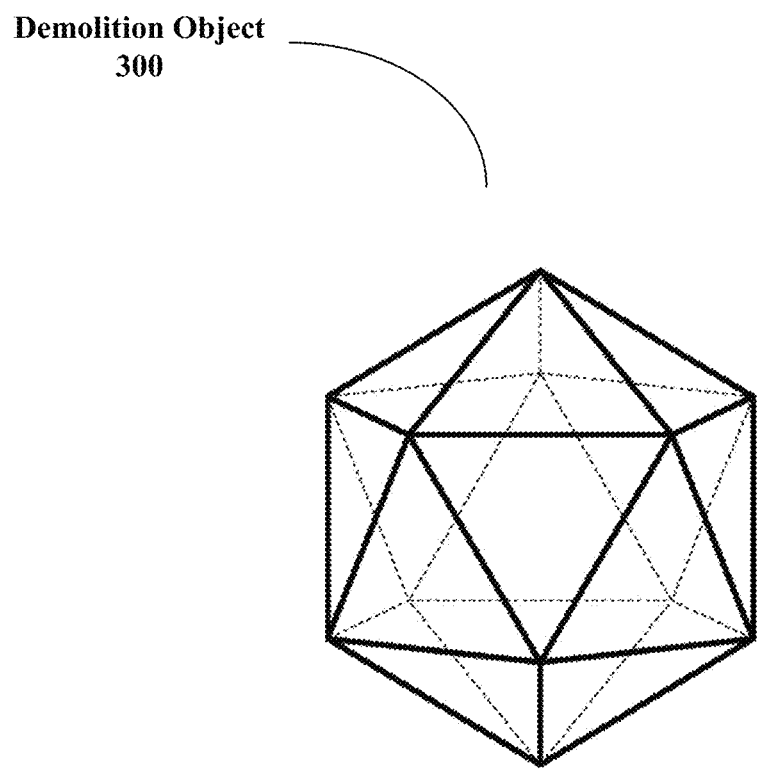
FIGS. 3A-3F illustrate demolition objects in accordance with various aspects of the present disclosure.

As shown in FIGS. 3A-3F, demolition objects may take various shapes or geometries depending on the component the demolition objects are to be introduced into, the types of support structures to be removed, or other factors. For example, as shown in FIG. 3A, demolition object 300 may be in the shape of an icosahedron, or an icosahedral framework, such that upon the application of temperature change 210, demolition object 300 becomes icosahedral in shape, and is reduced in shape at ambient temperatures. As such, demolition object 300 can collapse or expand upon application of heat (or other temperature change 204/210) to allow for the change in shape of the demolition object 300.

In an aspect of the present disclosure, different geometrical shapes may be used without departing from the scope of the present disclosure. Tetrahedrons, cubes, octahedreons, dodecahedrons, cuboids, pyramids, cones, prisms, rings, spheres, or other geometrical shapes, either as shape 202, deformed shape 206, or returned shape 208, can be used as demolition objects without departing from the scope of the present disclosure. Multiple shapes may be used as demolition objects 300 at any given time for any given part or component without departing from the scope of the present disclosure.

Figure 3B:
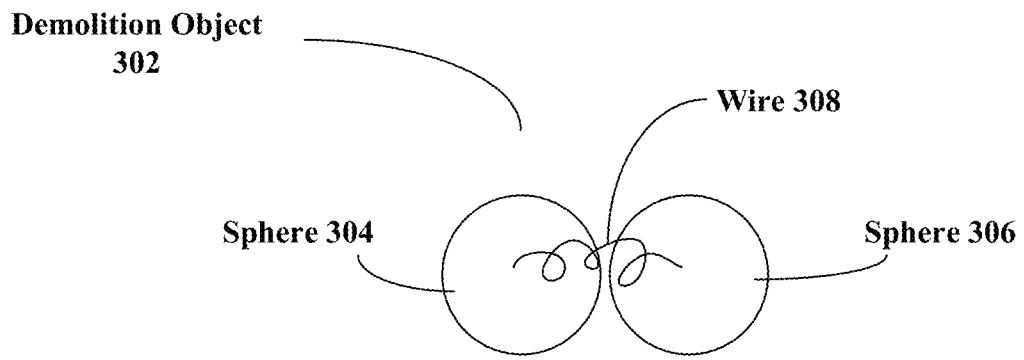
Figure 3C:
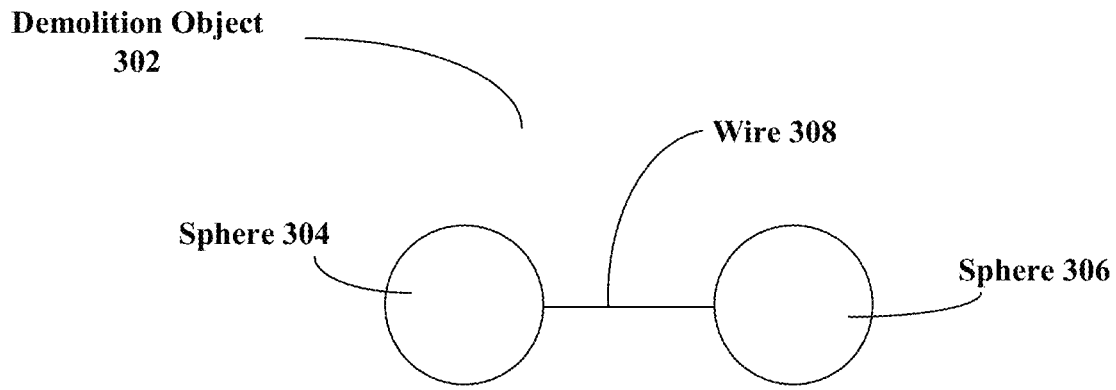
Figure 3D:
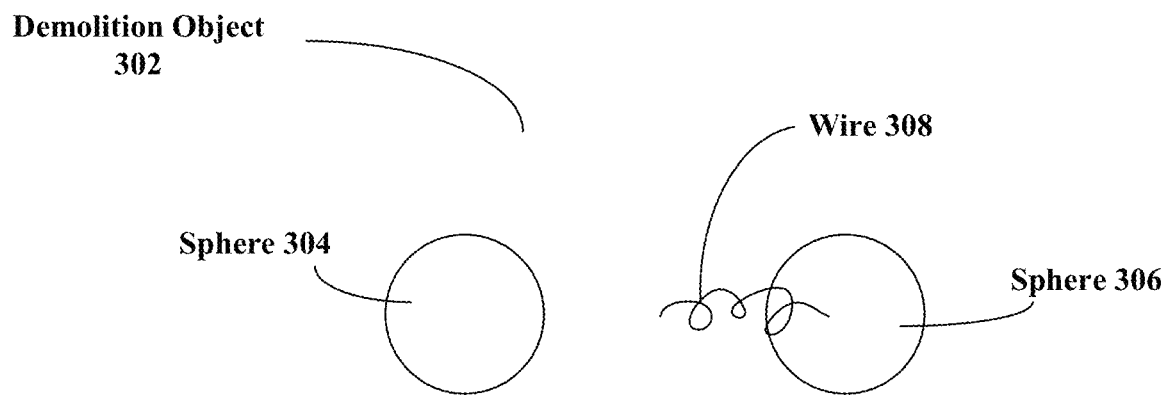

As shown in FIG. 3B, demolition object 302 may include sphere 304, sphere 306, and a connecting wire 308. One or more of sphere 304, sphere 306, and connecting wire 308 may be made from SMA materials, such that sphere 304, sphere 306, and/or connecting wire 308 may expand or contract upon the application of temperature change 204/temperature change 210 as desired as shown in FIG. 3C. Further, sphere 304, sphere 306, and connecting wire 308 may disconnect from each other, or at least disconnect sphere 304 and sphere 306, upon application of temperature change 204/temperature change 210 as shown in FIG. 3D.

Figure 3E:
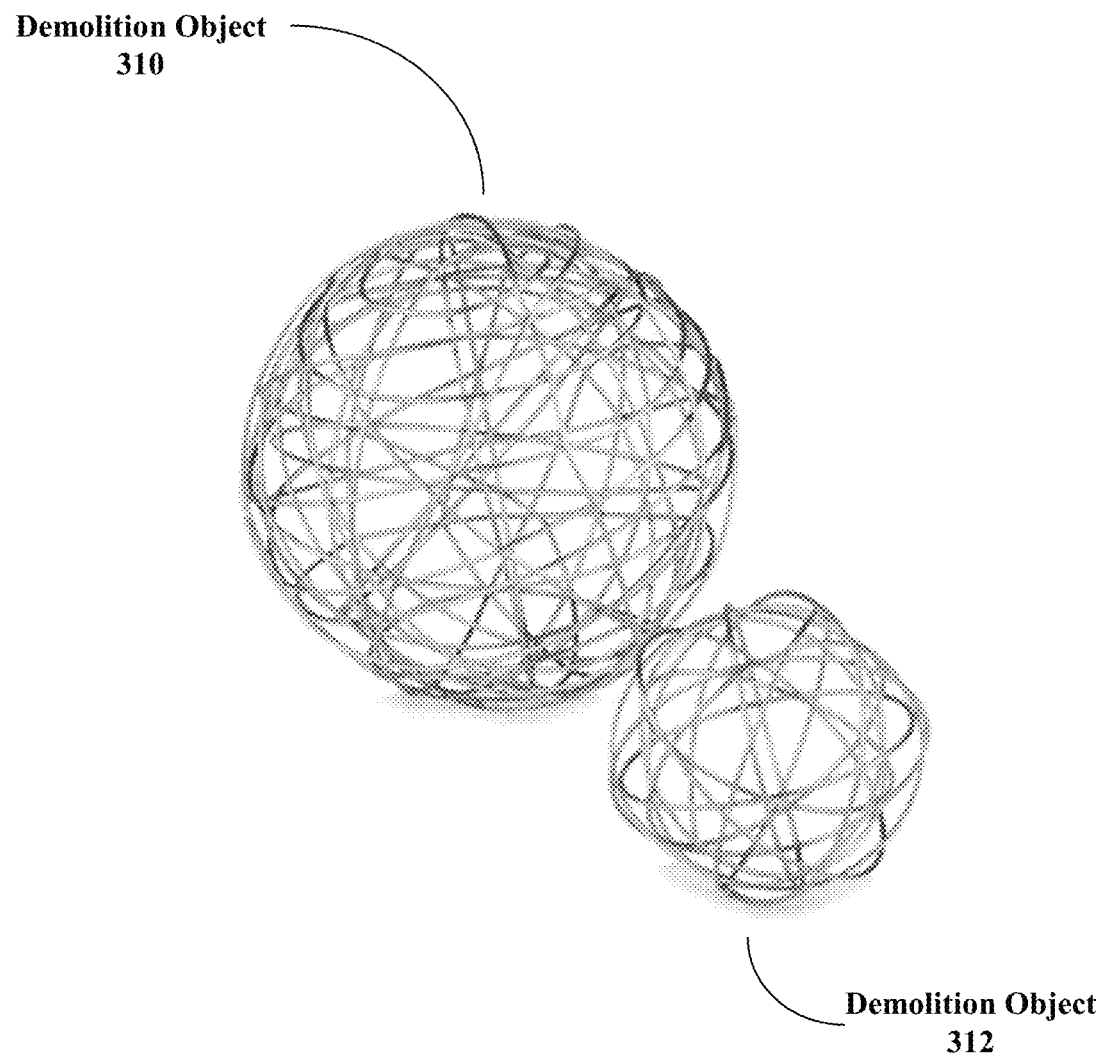

In an aspect of the present disclosure, as shown in FIG. 3E, demolition object 310 may include a wire frame. Demolition object 312 may also be a wire frame of a different size than demolition object 310. One or more of demolition object 310 and 312 may include a core of smaller objects that may be released upon the application of temperature change 204/temperature change 210, which may increase the total mass of demolition object 310 and/or demolition object 312. Further, any objects contained within demolition object 310 and/or demolition object 312 may be released from demolition object 310 and/or demolition object 312 upon the application of temperature change 204/temperature change 210.

Figure 3F:
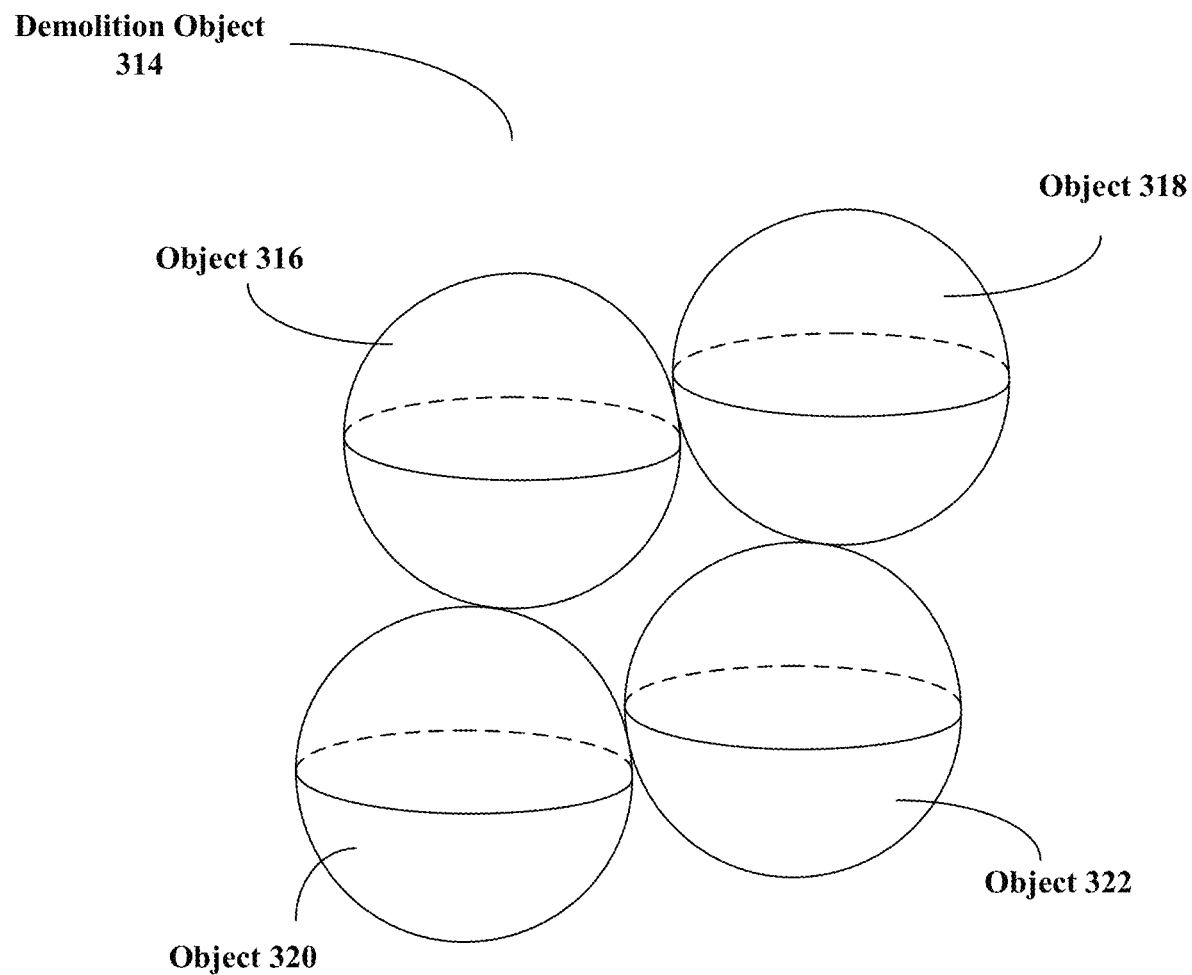

FIG. 3F illustrates a demolition object in accordance with an aspect of the present disclosure.

As shown in FIG. 3F, demolition object 314 may include a cluster formation of objects to break down the support structures. For example, and not by way of limitation, in an aspect of the present disclosure demolition object 314 may include object 316, object 318, object 320, and object 322. Demolition object may include more or fewer objects 316-320 as desired.

In an aspect of the present disclosure, once the pulverized support structures and demolition objects 314 are removed from a given part or component, there is a possibility of some trapped demolition objects 314. The demolition objects 314 can be separated to individual parts, e.g., object 316, object 318, object 320, and object 322, by the action of heat, water, organic solvents or a combination thereof. In an embodiment, objects 316-322, which may be insoluble, may be bound together with a binding medium such as a hot melt adhesive that will de-bond objects 316-322 on raising the temperature of the part or component. In an embodiment, the binding medium may be soluble, and upon on flooding the component with a solvent the binding medium will dissolve. In such embodiments, demolition objects 314 will be freed from the cluster formation and revert to their individual object 316-322 sizes which may allow easier and complete removal of demolition object 314 from the 3D printed part. In some embodiments demolition object 314 may be combined with other types of demolition objects or objects 316-318 may be meltable/dissolvable alloys as desired.

In an aspect of the present disclosure, the size of demolition objects 200, 300, 302, 310, 312, and 314 may vary in size from a 1 micron diameter to 5 inches in diameter. In an aspect of the present disclosure, the shape of demolition objects 200, 300, 302, 310, 312, and 314 may vary, from spherical to elongated with acicularity of up to 10:1, to random shapes, jagged shapes, geometrical shapes, and mixtures and combinations of these shapes as desired.

In an aspect of the present disclosure, the melting temperature of demolition objects 200, 300, 302, 310, 312, and 314 may vary from 30 degrees Celsius (° C.) to 2800° C., and the density of demolition objects 200, 300, 302, 310, 312, and 314 may vary from 0.5 grams/cubic centimeter (g/cm3) to 23 g/cm3.

In an aspect of the present disclosure, demolition objects 200, 300, 302, 310, 312, and 314 may be additively manufactured. Demolition objects 200, 300, 302, 310, 312, and 314 may be made from aluminum, stainless steel, copper, cobalt, chrome, titanium, magnesium, calcium, silicon, zinc, zirconium, tungsten, gold, iron, cadmium, manganese, lead, mercury, radioactive metals, other metals, ceramics, organic material, alloys of the above materials, or combination of the above materials.

In an aspect of the present disclosure, demolition objects 200, 300, 302, 310, 312, and 314 may be heated or exposed to solvents for varying amounts of time, from less than one minute to over one hour, without departing from the scope of the present disclosure.

Some of the demolition objects 200, 300, 302, 310, 312, and 314 described herein may comprise one or more components bonded together and/or one or more components that would change shape on subjecting to heat. In an aspect of the present disclosure, demolition objects 200, 300, 302, 310, 312, and 314 that are based on one continuous component may be able to corrode, dissolve, crack, or in general break into smaller objects on application of heat, agitation, solvents, or other forces as desired.

In an aspect of the present disclosure, the reduction in size of demolition objects 200, 300, 302, 310, 312, and 314 may be based on subjecting the demolition objects to triggers such as water or heat. Other triggers to reduce the size of demolition objects 200, 300, 302, 310, 312, and 314 may include use of electrolytic or salt solutions such as brine, KCl, etc. Further triggers can include acidic or basic solutions, electrical forces, radiation, sound, ultrasound, pressure, magnetic, vibration, rotational forces exerting g forces, etc. Multiple triggers may be applied at the same time or in sequence, which may break down the demolition objects 200, 300, 302, 310, 312, and 314 in rapid fashion. Further, demolition objects 200, 300, 302, 310, 312, and 314 may be reduced in size through the use of triggers while reducing or minimizing extreme conditions, e.g., high heat, high or low pH, corrosive salts, etc. Such triggers and/or other reductions in size for demolition objects 200, 300, 302, 310, 312, and 314 may ease removal of demolition objects 200, 300, 302, 310, 312, and 314 from a given component.

Demolition objects 200, 300, 302, 310, 312, and 314 may be designed to have the desired size, shape, density, and hardness to achieve more efficient demolition effects on support structures of 3D printed parts.

In an aspect of the present disclosure, a dissolvable demolition object objects 200, 300, 302, 310, 312, or 314 can be removed from a part after destruction of support structures by injection of high pressure steam in to cavities of 3D printed parts. The injection of high pressure steam may dissolve and rapidly remove any obstructed demolition object 200, 300, 302, 310, 312, and 314, and may shorten the residence time of dissolved or broken parts in the 3D printed part.

As described herein, the demolition object 200, 300, 302, 310, 312, and 314 may break the support structure before changing shape, e.g., as with a demolition object made from an SMA material, or after the change of shape, e.g., as with a meltable or dissolvable demolition object.

Figure 4:
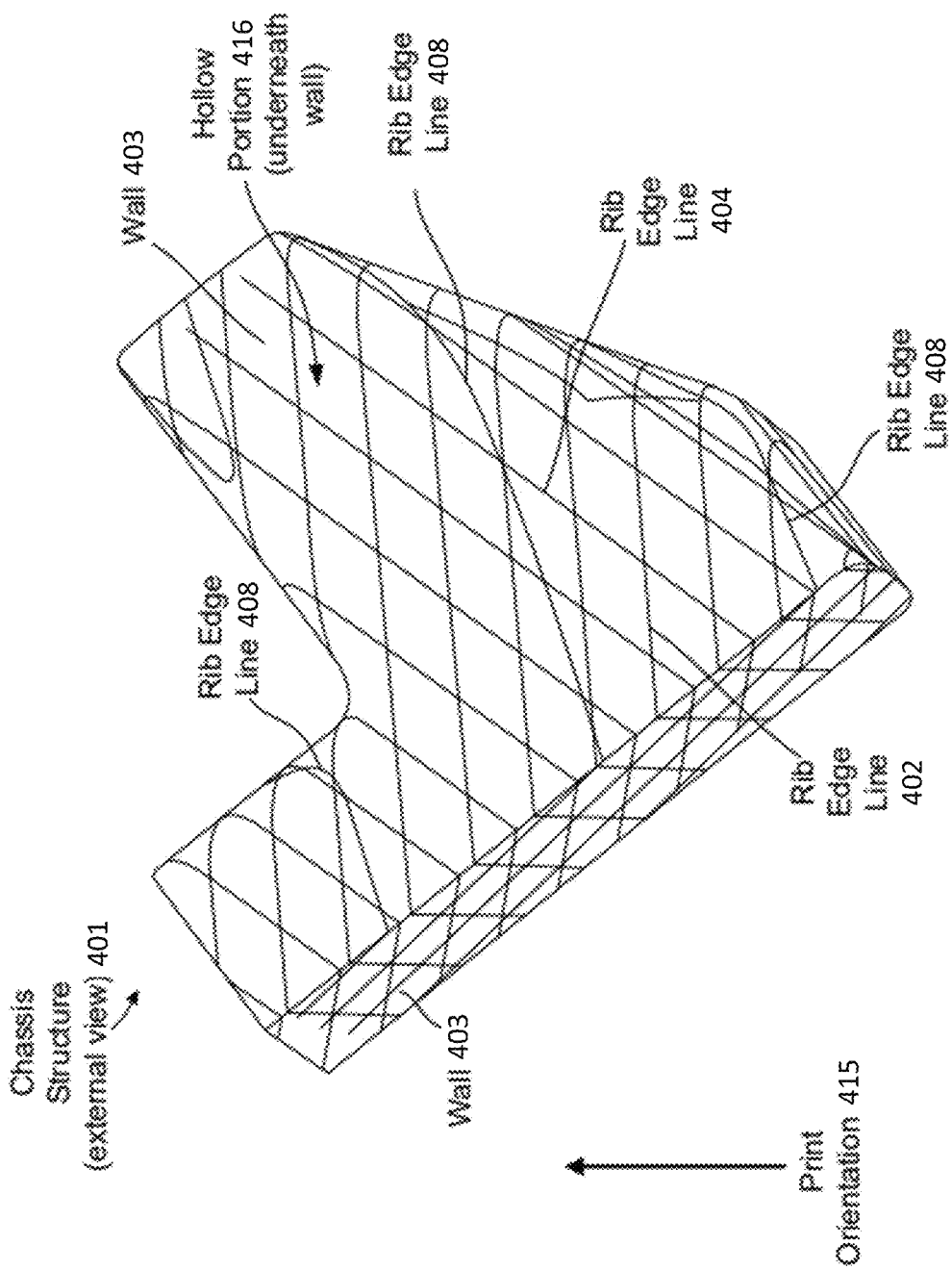
FIG. 4 illustrates a perspective view of a vehicle chassis structure in accordance with an aspect of the present disclosure.

FIG. 4 illustrates a perspective view of a vehicle chassis structure in accordance with an aspect of the present disclosure.

FIG. 4 illustrates an external perspective view of a vehicle chassis structure 401 in accordance with an embodiment. Chassis structure 401 is a 3-D printed hollow structure with internal ribs. Chassis structure 401 can be formed of an alloy described herein. In an embodiment, the chassis structure 401 is a vehicle node. Chassis structure 401 includes walls 403, which are outer walls defining the external surface of the chassis structure. In other words, walls 403 represent the outer skin of the chassis structure. As such, walls 403 extend around a perimeter of the chassis structure and bound a hollow portion 416 inside the hollow chassis structure 401.

Chassis structure 401 includes internal ribs, some of which may be support structures, that contact an inner surface of walls 403 at rib edge lines 402, 404, and 408. In other words, rib edge lines 402, 404 and 408 show the edges of the internal ribs where the internal ribs meet the inner surface of respective walls 403. The internal ribs can be formed with the inner surface of walls 403 during the 3-D printing process, for example. The internal ribs that correspond to rib edge lines like 402, 404 and 408 can extend the full length across hollow portion 416 of the chassis structure 401, that is, the internal ribs can extend from one wall to an opposing wall on the other side of the chassis structure, as shown in more detail in FIG. 5. As an example, while the volume of hollow portion 416 may vary substantially depending on the nature of the chassis structure 401 and on the target specifications for dynamic stiffness, etc., in one exemplary embodiment, the hollow portion is approximately 1000 milliliters. In other embodiments this value could be larger or smaller.

As shown in greater detail below, the ribs can include multiple sets of ribs. Here, each of rib edge lines 402, 404 and 408 belongs to a different set of generally parallel ribs. That is, in this embodiment, each set of ribs includes multiple, parallel ribs, such that each rib in a set intersects with one or more ribs in the other sets. In this way, for example, the intersections of the ribs can provide support to help allow the individual ribs to be self-supporting during the 3D printing process, such that some of the ribs do not need support structures during printing, and in some embodiments to help the intersecting ribs act as more effective stiffening structures when handling external loads on the chassis structure when the chassis structure is in operation. In other embodiments, additional or different criteria may be used to assist the ribs to be self-supporting as well as to allow the ribs to optimally handle external loads and attenuate high frequency plate modes. For example, placing the intersecting sets of ribs at different angles relative to one another may be another factor helping the ribs to be self-supporting, and/or helping the ribs to act as more effective stiffening structures when handling external loads. Print orientation 415 is shown to illustrate how the chassis structure and rib edge lines in FIG. 4 are aligned relative to the print orientation, as described further below. In FIG. 4, print orientation 415 is pointed upwards and generally perpendicular to a plane of the upper surface of build plate 107.

Figure 5:
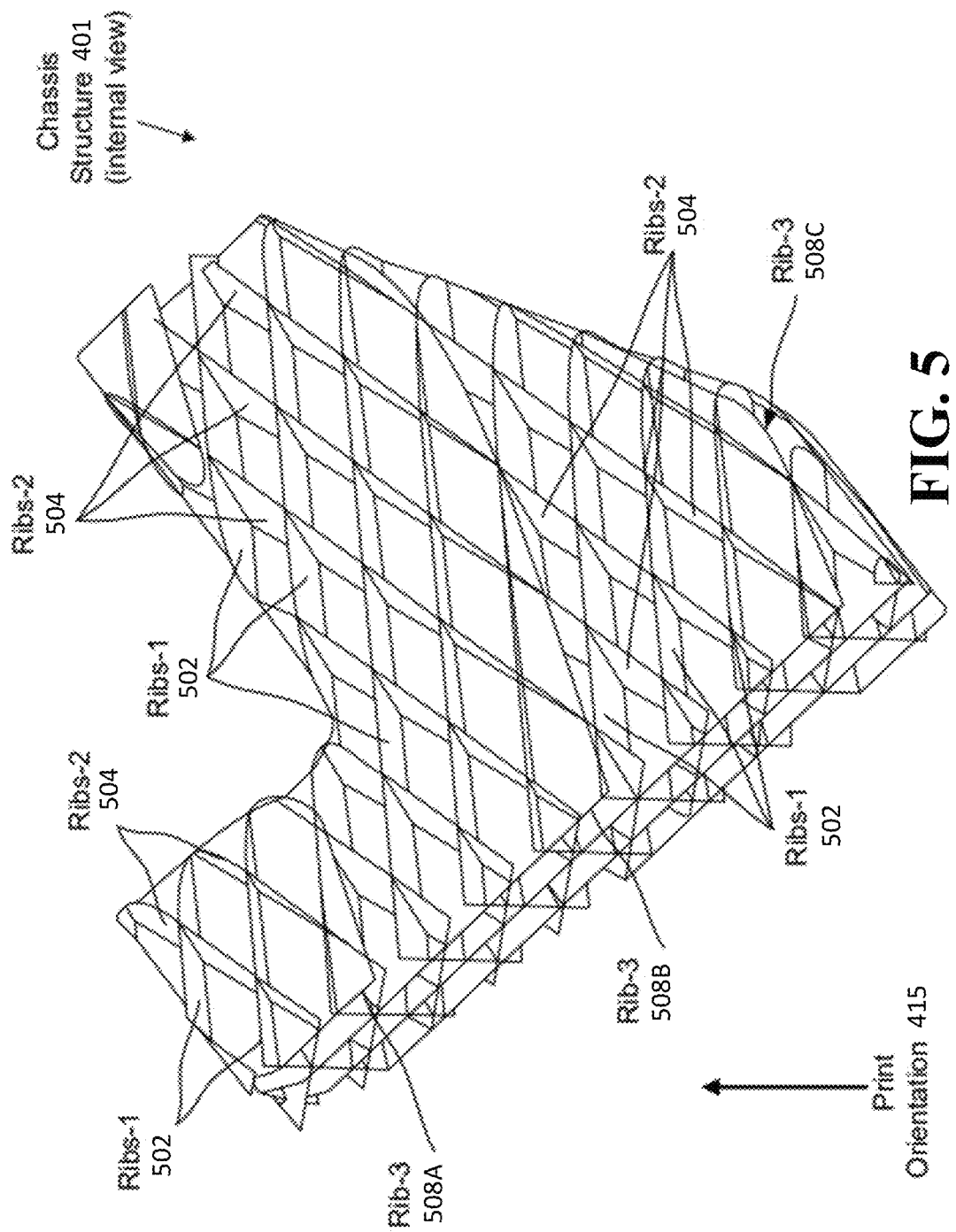
FIG. 5 illustrates a perspective view of the vehicle chassis structure with the outer walls removed in accordance with an aspect of the present disclosure.

FIG. 5 illustrates a perspective view of the vehicle chassis structure with the outer walls removed showing the internal ribs in accordance with an aspect of the present disclosure.

FIG. 5 illustrates an internal perspective view of the chassis structure 101 of FIG. 4 with the outer walls 403 removed to show details of the ribs within hollow portion 416. In an embodiment, the chassis structure 401 may constitute a node. Chassis structure 401 in FIG. 5 has been topologically optimized via one or more algorithms to produce a node with a reduced mass. FIG. 5 shows a more detailed view of the internal ribs of the chassis structure 401. As indicated in FIG. 4, there exist three different internal rib sets throughout the node. More specifically, the different sets of ribs in FIG. 5 include (i) a first set of parallel ribs (i.e., ribs-1 502) which is positioned in a first direction, (ii) a second set of parallel ribs (i.e., ribs-2 504) which is positioned in a second direction such that the two sets of ribs (i.e. ribs-1 502 and ribs-2 504) intersect each other at a number of different locations throughout the chassis structure 401, and (iii) a third set of ribs (three of which are referenced as rib-3 508A, rib-3 508B and rib-3 508C) which is positioned in a direction that spans across part or all of the first two sets of ribs and therefore intersects the first two sets of ribs (i.e., ribs-1 502 and ribs-2 504) at different locations throughout the chassis structure.

As is evident from FIG. 5, each of ribs labeled rib-3 508A-C have different lengths, and therefore shorter ribs-3 508A-B do not intersect all of the ribs in the other two sets of ribs. In addition, to avoid unduly obscuring the concepts in FIG. 5, not all ribs in all sets have been specifically identified by reference number.

Ribs-1 502 are shown as intersecting ribs-2 504, which in turn creates a plurality of 'diamond shaped' pockets in the chassis structure 401. Likewise, each rib-3 508 cuts at least partially through one or more ribs in the first two sets of ribs (i.e., ribs-1 502 and ribs-2 504) to create additional pockets in lower planes of the chassis structure 401.

Producing a plurality of ribs in the third set (i.e., each rib-3 508) can be used to further support the first and second sets of ribs (i.e. ribs-1 502 and ribs-2 504). This added support can enable chassis structure 401 to use only self-supporting ribs to act as stiffening structures that meet dynamic stiffness requirements while concurrently minimizing the mass of the chassis structure 401. Chassis structure 401 is for illustrative purposes only, and other chassis structures, such as other nodes, may use fewer or more ribs in each set of ribs, as necessary, to accomplish its target goals. In addition, while three sets of ribs are shown in FIG. 5, in other embodiments a different number of sets of ribs is also possible.

In various embodiments, some of the ribs can be support structures that will be removed, e.g., by methods described herein, and some of the ribs can be permanent and used as stiffening structures for nodes. Another advantage of the chassis structure 401 in FIGS. 4 and 5 is that the mass of the chassis structure 401 can be dramatically reduced due to the thinner walls that can be used (e.g., 1-2 millimeters (mm) or less) and the removal of the support structures. The number, thickness and orientation of the ribs may also be optimally selected to minimize overall mass of the chassis structure 401. For example, the ribs can in various embodiments be made with a thickness of about 1-4 millimeters (mm), or less.

In an aspect of the present disclosure, demolition objects 200, 300, 302, 310, 312, and 314 may be introduced into structure 401 to remove the ribs that are support structures that were printed during manufacturing of structure 401.

In an aspect of the present disclosure, demolition objects 200, 300, 302, 310, 312, and 314 may be too large to be introduced into structure 401 when in one state, but may be small enough to be introduced in another state. For example, and not by way of limitation, a demolition object 200 made from a shape memory alloy may be small enough in an initial state, e.g., deformed shape 206, but too large in shape 202 or returned shape 208. As such, demolition object 200 may be introduced into structure 401 at a first temperature which allows demolition object 200 to be in deformed shape 206, and temperature change 210 may be applied to change demolition object 200 to change demolition object to returned shape 208. Further, temperature change 210 may allow demolition object 200 to create a force of the support structure in sufficient value to break the support structure. The demolition object 200 may then be changed back into deformed shape 206 while the demolition object 200 is within the hollow portion of the 3-D printed part.

In an aspect of the present disclosure, demolition object 200, 300, 302, 310, 312, and 314 may be introduced into the structure 401 through a first opening in the 3-D printed part and removed through a second opening in the 3-D printed part.

Figure 6:
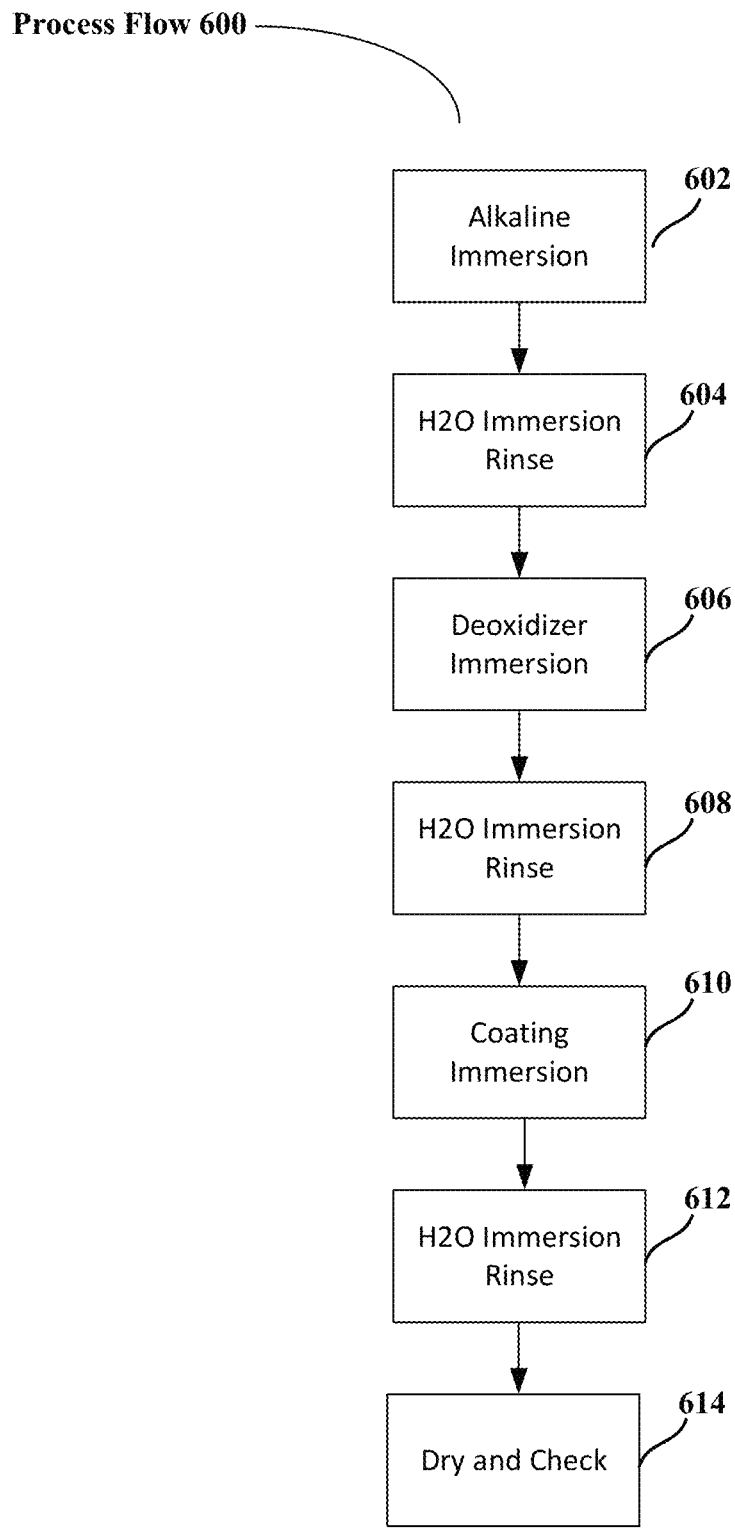
FIG. 6 illustrates a pretreatment method in accordance with an aspect of the present disclosure.

FIG. 6 illustrates a pretreatment method in accordance with an aspect of the present disclosure.

In an aspect of the present disclosure, any trapped demolition objects 200, 300, 302, 310, 312, and 314 may be liberated from the part, e.g., structure 401, by application of acid or brine solution, e.g., while simultaneously agitating or exciting the part using one of both of high and low frequency mechanical vibrations.

For aluminum parts, pretreatment lines typically already incorporate an acid etching type process prior to the conversion coating step. The line may be modified to incorporate features to filter and extract any demolition objects 200, 300, 302, 310, 312, and 314 and/or broken support structures. Such removed demolition objects 200, 300, 302, 310, 312, and 314 may be filtered and reused as desired.

FIG. 6 shows a flow diagram illustrating an exemplary process flow 600 for manufacturing a part in accordance with an aspect of the present disclosure.

At 602, the part, e.g., structure 401, is immersed in an alkaline solution. Such an alkaline solution may be Inproclean 3800 or other similar solution.

At 604, the part, e.g., structure 401, may be rinsed or immersed in water to remove or neutralize any residual alkaline solution from 602. This may be a deionized water rinse or immersion as desired.

At 606, the part, e.g., structure 401, is immersed in a deoxidizer solution. Such a solution may be Gardobond® Additive 714X/1 or other deoxidizing solution as desired.

At 608, the part, e.g., structure 401, may be rinsed or immersed in water to remove or neutralize any residual deoxidizer solution from 606. This may be a deionized water rinse or immersion as desired.

At 610, the part, e.g., structure 401, may be protected or sealed in a coating solution. Such a solution may be Gardobond® X4707A, X4707, 7255, 7271, 7140/1, or other solution as desired.

At 612, the part, e.g., structure 401, may be rinsed or immersed in water to remove or neutralize any residual alkaline solution from 610. This may be a deionized water rinse or immersion as desired.

At 614, the part, e.g., structure 401 may be dried and checked for quality, adequate removal of demolition objects 200, 300, 302, 310, 312, and 314, and other items.

As part of any of the above, or in addition to the above process flow 600, demolition objects 200, 300, 302, 310, 312, and 314 may be introduced into structure 401 and removed either partially or totally during one or more of 602-612. Additional immersions, rinsing, cleaning, or other processes may be added, whether as additional tanks, directed jets, time, temperature, etc. to ensure both object demolition and adequate removal of all salts or other corrosive or deleterious fluids from structure 401. Non-limiting examples of methods of assuring clearance of demolition objects, could include weighing structure 401, lack of further evidence of ongoing dissolution products, embedded tracer elements within demolition object that evidence, characteristic acoustic signature, etc.

Figure 7:
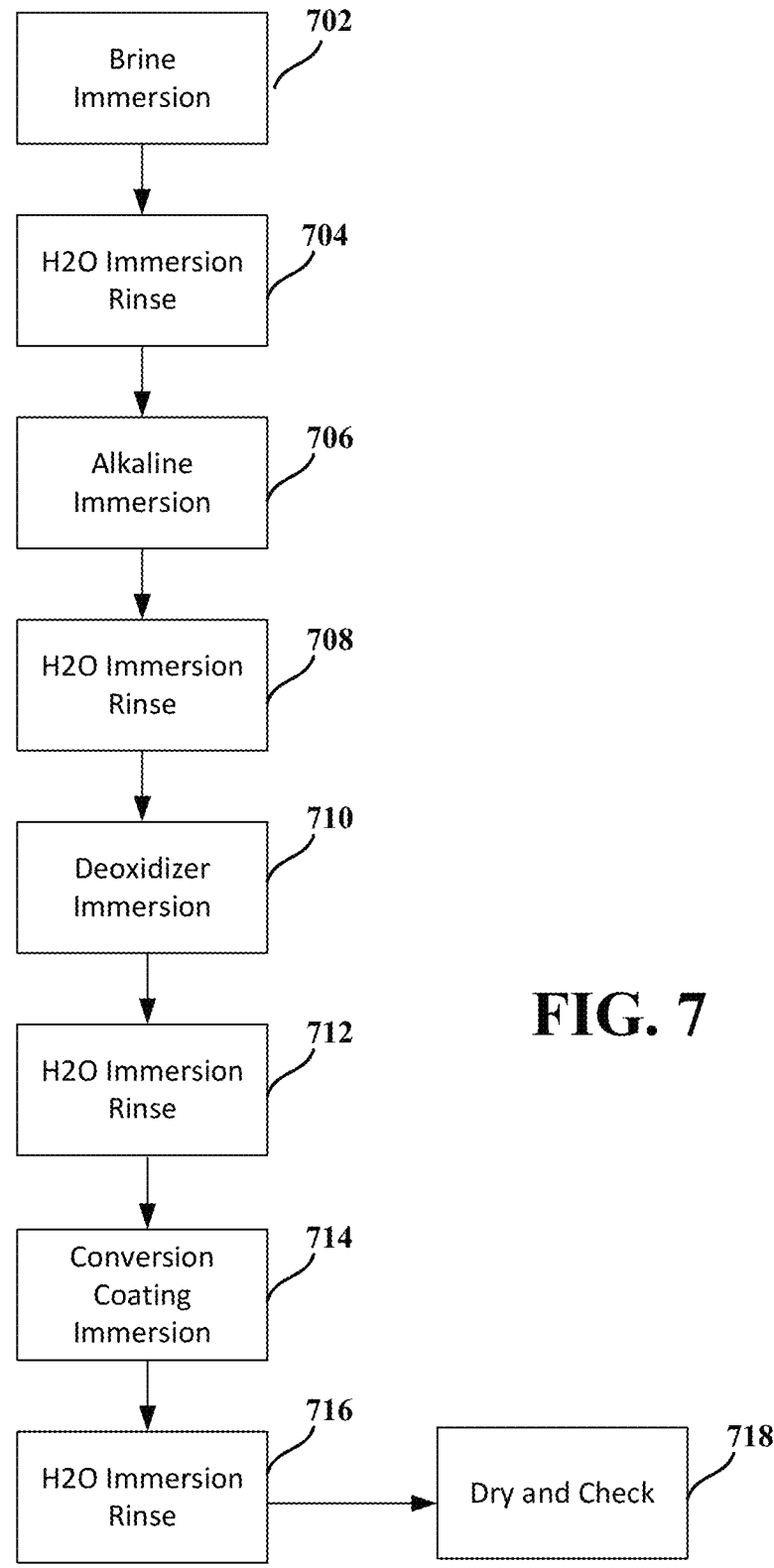
FIG. 7 illustrates a pretreatment method in accordance with an aspect of the present disclosure.

FIG. 7 illustrates a pretreatment method in accordance with an aspect of the present disclosure.

FIG. 7 shows a flow diagram illustrating an exemplary process flow 700 for manufacturing a part in accordance with an aspect of the present disclosure.

At 702, the part, e.g., structure 401, is immersed in a brine solution. Such a solution may be a 5% potassium chloride (KCl) solution, which may be applied with heat and/or agitation.

At 704, the part, e.g., structure 401, may be rinsed or immersed in water to remove or neutralize any residual brine solution from 702. This may be a deionized water rinse or immersion as desired.

At 706, the part, e.g., structure 401, is immersed in an alkaline solution. Such an alkaline solution may be Inproclean 3800 or other similar solution.

At 708, the part, e.g., structure 401, may be rinsed or immersed in water to remove or neutralize any residual alkaline solution from 706. This may be a deionized water rinse or immersion as desired.

At 710, the part, e.g., structure 401, is immersed in a deoxidizer solution. Such a solution may be Gardobond® Additive 714X/1 or other deoxidizing solution as desired.

At 712, the part, e.g., structure 401, may be rinsed or immersed in water to remove or neutralize any residual deoxidizer solution from 712. This may be a deionized water rinse or immersion as desired.

At 714, the part, e.g., structure 401, may be protected or sealed in a coating solution. Such a solution may be Gardobond® X4707A, X4707, 7255, 7271, 7140/1, or other solution as desired.

At 716, the part, e.g., structure 401, may be rinsed or immersed in water to remove or neutralize any residual alkaline solution from 610. This may be a deionized water rinse or immersion as desired.

At 718, the part, e.g., structure 401 may be dried and checked for quality, adequate removal of demolition objects 200, 300, 302, 310, 312, and 314, and other items.

As part of any of the above, or in addition to the above process flow 700, demolition objects 200, 300, 302, 310, 312, and 314 may be introduced into structure 401 and removed either partially or totally during one or more of 702-716. Additional immersions, rinsing, cleaning, or other processes may be added, whether as additional tanks, directed jets, time, temperature, etc. to ensure both object demolition and adequate removal of all salts or other corrosive or deleterious fluids from structure 401. Non-limiting examples of methods of assuring clearance of demolition objects, could include weighing structure 401, lack of further evidence of ongoing dissolution products, embedded tracer elements within demolition object that evidence, characteristic acoustic signature, etc.

Optionally a rapid curtain of air may be used to remove a greater level of surface liquid prior to transfer of structure 401 from one immersion bath to the next, thereby helping to reduce hold time and contamination between baths. Furthermore, removal of excess internally trapped liquid and residues may be achieved similarly by simultaneous jetting of air into the structure 401.

In a related embodiment, the final rinse 716 may be used for ultrasonic immersion testing to run a quality check on structure 401, and also determine potential amount of residual contamination within the parts. Combining a portion of 716 and 718 may be performed prior to drying of each structure 401.

In another embodiment, internal residues of the various solutions which structure 401 is immersed in may be removed by direct attachment of structure 401 to inlet and outlet jets which stream the required fluids into the parts. The stream may be composed of basic, acidic, aqueous including high pressure steam, chemical, air or other required treatments. This process may be carried out as an immersion bath as described in FIGS. 6 and 7, or may be isolated from such immersion baths. The inlet and outlet connections may be designed to easily attach and detach from structure 401, streamlining the process for robotic participation.

Figure 8:
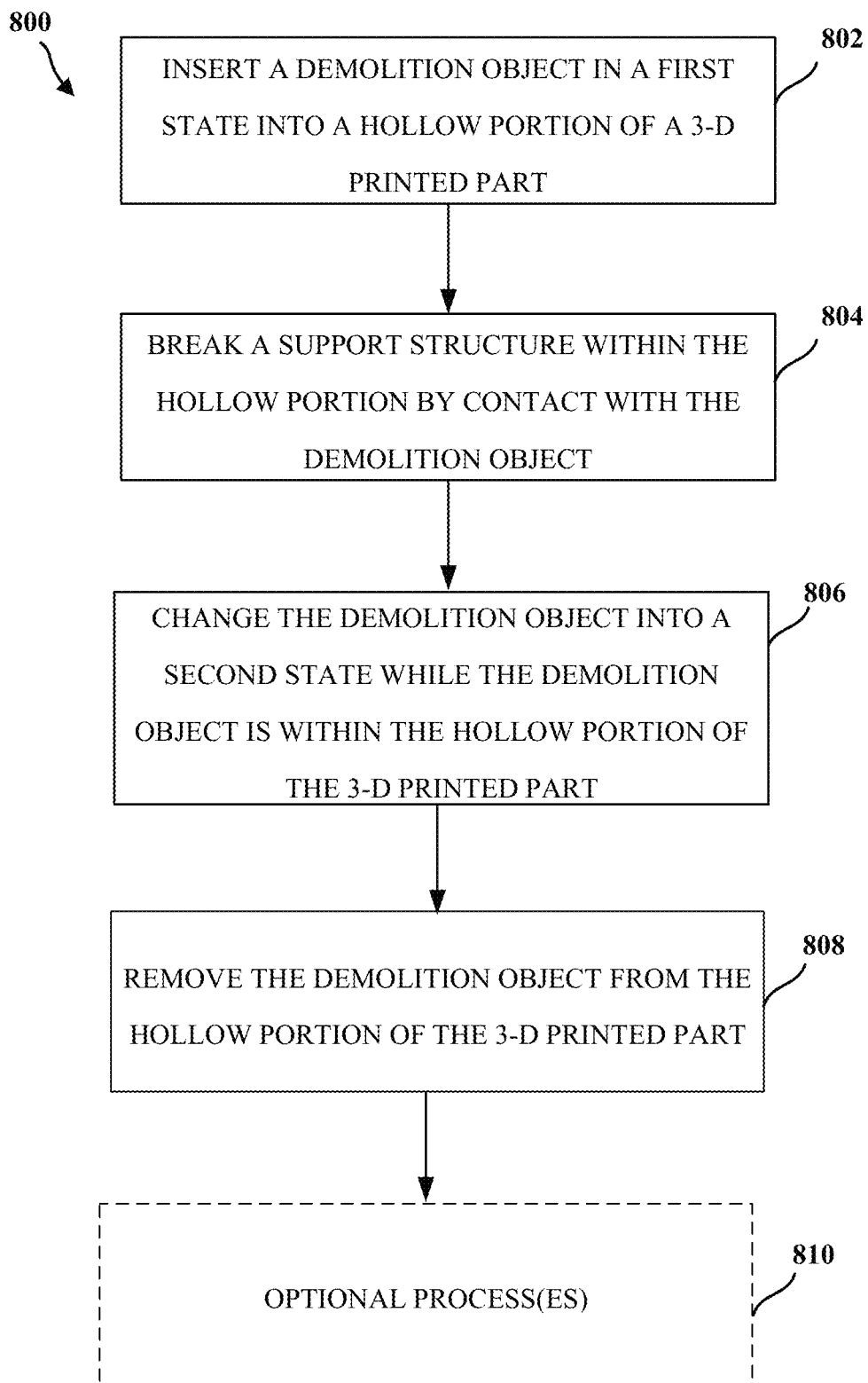
FIG. 8 shows a flow diagram illustrating an exemplary method for additively manufacturing a part or component in accordance with an aspect of the present disclosure.

FIG. 8 shows a flow diagram illustrating an exemplary method for removal of supports from additively manufactured structures in accordance with an aspect of the present disclosure.

FIG. 8 shows a flow diagram illustrating an exemplary method 800 for additively manufacturing a part in accordance with an aspect of the present disclosure. The objects that perform, at least in part, the exemplary functions of FIG. 8 may include, for example, computer 150 and one or more components therein, a three-dimensional printer, such as illustrated in FIGS. 1A-E, and other objects that may be used for forming the above-referenced materials.

It should be understood that the steps identified in FIG. 8 are exemplary in nature, and a different order or sequence of steps, and additional or alternative steps, may be undertaken as contemplated in this disclosure to arrive at a similar result.

At 802, a demolition object in a first state is inserted into a hollow portion of a 3-D printed part.

An optional addition to 802 may be inserting the demolition object with an energy sufficient to break a support structure within the hollow portion of the 3-D printed part. Another optional addition to 802 is agitating the 3-D printed part while the demolition object is within the hollow portion of the 3-D printed part.

Other optional additions to 802 include injecting the demolition object into the hollow portion of the 3-D printed part by the force of at least a liquid or a gas, and inserting the demolition object into a first opening in the 3-D printed part, and the demolition object including a shape memory alloy (SMA).

At 804, a support structure within the hollow portion is broken by contact with the demolition object.

At 806, the demolition object is changed into a second state while the demolition object is within the hollow portion of the 3-D printer part. The support structure within the hollow portion may be broken before the change of state, e.g., as with a demolition object made from a SMA material, or after the change of state, e.g., as with a dissolvable or meltable demolition object.

An optional addition to 806 may be the first state including a hardened state and the second state including a softened state. Other optional additions to 806 may include the hardened state being an unmelted state, the softened state being a melted state, increasing a temperature in the hollow portion of the 3-D printed part, the demolition object comprising at least a material having a melting temperature lower than a melting temperature of the 3-D printed part, the demolition object including a dissolvable portion, the first state including an undissolved state, the second state including a dissolved state that includes a solution of the dissolvable portion, introducing a solvent into the hollow portion of the 3-D printed part, and the dissolvable portion of the demolition object comprising the entire demolition object, where changing the demolition object into the second state includes dissolving the entire demolition object.

Other optional additions to 806 may include the demolition object including an insoluble portion, where the solution includes the insoluble portion which has not been dissolved, the insoluble portion of the demolition object including at least aluminum, stainless steel, copper, cobalt, chrome, titanium, magnesium, calcium, silicon, zinc, zirconium, tungsten, gold, iron, cadmium, manganese, lead, mercury, radioactive metals, other metals, ceramics, organic materials, alloys thereof, or combinations thereof, and changing the demolition object into the dissolved state including introducing at least water, an acidic, an electrolyte, a salt, a base, an electrical force, a radiation, a sound, an ultrasound, a pressure, a magnetic force, a vibration, and a rotational force.

Other optional additions to 806 may include the dissolvable portion including at least an adhesive and a polymer, the demolition object including a shape memory alloy (SMA) where the first state includes a first shape of the SMA at a first temperature, and the second state includes a second shape of the SMA at a second temperature, and the changing of the SMA into the second state being configured to create a force on the support structure where breaking the support structure is caused by the force.

At 808, the demolition object is removed from the hollow portion of the 3-D printed part.

An optional addition to 808 may be removing the solution from the hollow portion of the 3-D printed part. Another optional addition to 808 may include inserting the demolition object into a first opening in the 3-D printed part and removing the demolition object through a second opening in the 3-D printed part, and an initial shape of the demolition object being too large to be removed through the second opening in the 3-D printed part.

At 810, optional processes may be performed. Such optional processes may include changing the demolition object from the second state back into the first state while the demolition object is within the hollow portion of the 3-D printed part.

The previous description is provided to enable any person ordinarily skilled in the art to practice the various aspects described herein. Various modifications to these exemplary embodiments presented throughout this disclosure will be readily apparent to those of ordinary skill in the art, and the concepts disclosed herein may be applied to aluminum alloys. Thus, the claims are not intended to be limited to the exemplary embodiments presented throughout the disclosure but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A method comprising:
   inserting a demolition object in a first state into a hollow portion of a 3-D printed part;
   breaking a support structure within the hollow portion by contact with the demolition object;
   changing the demolition object into a second state while the demolition object is within the hollow portion of the 3-D printed part; and
   removing the demolition object from the hollow portion of the 3-D printed part,
   wherein the demolition object includes a dissolvable portion, the first state includes an undissolved state, the second state includes a dissolved state that includes a solution of the dissolvable portion, and changing the demolition object into the dissolved state includes introducing a solvent into the hollow portion of the 3-D printed part.

2. The method of claim 1, wherein the first state includes a hardened state and the second state includes a softened state.

3. The method of claim 1, wherein removing the demolition object includes removing the solution from the hollow portion of the 3-D printed part.

4. The method of claim 3, wherein the demolition object further includes an insoluble portion, and the solution includes the insoluble portion, which has not been dissolved.

5. The method of claim 4, wherein the insoluble portion includes at least aluminum, stainless steel, copper, cobalt, chrome, titanium, magnesium, calcium, silicon, zinc, zirconium, tungsten, gold, iron, cadmium, manganese, lead, mercury, radioactive metals, other metals, ceramics, organic materials, alloys thereof, or combinations thereof.

6. The method of claim 1, wherein changing the demolition object into the dissolved state includes introducing the solvent comprising at least water, an acid, an electrolyte, a salt, or a base.

7. The method of claim 1, wherein the dissolvable portion includes at least an adhesive and a polymer.

8. The method of claim 1, wherein inserting the demolition object includes injecting the demolition object into the hollow portion of the 3-D printed part by the force of at least a liquid or a gas.

9. The method of claim 1, wherein the demolition object is inserted into a first opening in the 3-D printed part and removed through a second opening in the 3-D printed part.

10. The method of claim 9, wherein an initial shape of the demolition object is too large to be removed through the second opening in the 3-D printed part.

11. The method of claim 1, wherein the support structure is positioned to be encompassed by the hollow portion of the 3-D printed part during manufacturing of the 3-D printed part.

12. The method of claim 1, wherein changing the demolition object into the dissolved state includes introducing at least an electrical force, a radiation, a sound, an ultrasound, a pressure, a magnetic force, a vibration, or a rotational force.

* * * * *